(12) United States Patent
Subbaraman et al.

(10) Patent No.: US 8,200,055 B2
(45) Date of Patent: Jun. 12, 2012

(54) TWO-DIMENSIONAL SURFACE NORMAL SLOW-LIGHT PHOTONIC CRYSTAL WAVEGUIDE OPTICAL PHASED ARRAY

(76) Inventors: Harish Subbaraman, Austin, TX (US); Ray T Chen, Austin, TX (US)

( * ) Notice: Subject to any disclaimer, the term of this patent is extended or adjusted under 35 U.S.C. 154(b) by 170 days.

(21) Appl. No.: 12/804,263

(22) Filed: Jul. 19, 2010

(65) Prior Publication Data

US 2012/0013962 A1 Jan. 19, 2012

(51) Int. Cl.
G02B 6/34 (2006.01)
(52) U.S. Cl. .................. 385/37; 385/3; 385/8; 385/10; 385/18; 385/125
(58) Field of Classification Search .................. None
See application file for complete search history.

(56) References Cited

U.S. PATENT DOCUMENTS

| | | | |
|---|---|---|---|
| 4,639,091 A * | 1/1987 | Huignard et al. | 349/202 |
| 5,126,869 A * | 6/1992 | Lipchak et al. | 349/202 |
| 6,128,421 A * | 10/2000 | Roberts | 385/3 |
| 2005/0013541 A1* | 1/2005 | Kittaka et al. | 385/37 |
| 2007/0065068 A1* | 3/2007 | Wang | 385/8 |

FOREIGN PATENT DOCUMENTS

WO    WO 2008152479 A1 * 12/2008

* cited by examiner

*Primary Examiner* — Hemang Sanghavi (57) ABSTRACT

Methods and devices for optical beam steering are disclosed including coupling a laser light into an apparatus comprising a first substrate; an array of air core photonic crystal waveguides; columnar members etched around each air core waveguide; a pair of metal electrodes around the columnar members; a trench around the pair of metal electrodes surrounding each air core photonic crystal waveguide; a second substrate coupled to the first substrate comprising electrical interconnection lines; and a holographic fanout array comprising a third substrate; a photopolymer film coated on the third substrate; a hologram written in the photopolymer film configured to couple the laser light into the third substrate; and an array of holograms recorded in the photopolymer film configured to couple a portion of the laser light into the waveguides; and passing a current through the electrodes to induce a refractive index change in the first substrate to control the phase of the portion of the laser light that passes through each waveguide. Other embodiments are described and claimed.

26 Claims, 11 Drawing Sheets

TWO-DIMENSIONAL SURFACE NORMAL SLOW-LIGHT PHOTONIC CRYSTAL WAVEGUIDE OPTICAL PHASED ARRAY

BACKGROUND OF THE INVENTION

1. Field of the Invention

This invention relates generally to the field of optical beam steering systems, and more specifically to an apparatus and method for two dimensional optical beam steering for use in laser based radar systems.

2. Background of the Invention

Optical Phased Array (OPA) technology represents an enabling technology that makes possible simple, affordable, and lightweight laser beam steering with very precise stabilization, random access pointing, and programmable multiple simultaneous beams. Military applications include laser weapons, search and rescue, missile tracking, etc. Commercial side applications include laser printing, optical computing, etc. For all of the stated applications, an OPA technology is desired that exhibits high speed and large area scanning of laser beams covering wavelengths from the infrared to the ultraviolet. During the last decade, intensive efforts have been made to improve OPA performance and to develop OPAs based on nematic liquid crystals, active and passive optical waveguides using polymers, GaAs/AlGaAs, Silicon, Lithium Niobate, etc.

Liquid crystal (LC) is commonly used because of low driving voltage, large birefringence, and low cost fabrication techniques. Therefore, by applying appropriate driving voltages, the desired output phase pattern can be obtained and a deflection of the beam can be performed.

A static deflector device for deflecting a polarized infrared beam is suggested by Huignard et al. [U.S. Pat. No. 4,639,091, issued Jan. 27, 1987]. The static deflector consists of a liquid crystal layer and a modulator. Application of a staircase voltage waveform across the liquid crystal layer sandwiched between an optically transparent top striped electrode pattern and a reflective bottom electrode sets a diffraction grating of variable period inside the liquid crystal due to local variation of refractive index inside the liquid crystal layer. Huignard et al. address the two dimensional scanning via suggesting an apparatus for two beam deflectors by arranging the control electrodes 90° with respect to each other.

A two-dimensional transceiver utilizing four one beam deflectors, two for each of the orthogonal polarizations of the transceiver channels, a polarization rotator, and a polarization transformer is suggested by Lipchak et al. [U.S. Pat. No. 5,126,869]. The transmit and receive signals are on two linear and orthogonally polarized beams.

Although 2-D steering can be obtained for the liquid-crystal system by cascading two orthogonal oriented 1-D arrays, the efficiency, scanning speed, and scanning angle are still very low. Larger steering angles can be achieved by using a set of binary birefringent prisms. One polarization is deflected by the prism in one direction and the other polarization is deflected by the prism in the other direction. By rotating polarization between prism layers, binary beam steering at large angles can be accomplished. However, such systems are bulky and the polarizations of the intermediate birefringent prisms need to be rotated precisely for accurate angular control.

Optical waveguide based systems are capable of exhibiting large steering angles. The waveguides are arranged in an array with the required spacing. Both active and passive waveguides can be controlled to generate optical phase shift. For waveguide arrays made of Silicon (Hosseini A, Kwong D, Zhao Y, Chen Y-S, and Chen R. T, "Unequally-spaced Waveguide Arrays for Silicon Nano-membrane-based Efficient Large Angle Optical Beam Steering," IEEE Journal of Selected Topics in Quantum Electronics, Vol. 15, No. 5, 1439-1446, 2009), additional heaters are placed alongside the waveguides in order to induce optical phase shift via the thermo-optic effect. Recently, GHz steering speed phased array optical beam steering has been reported for an OPA using an array of GaAs/AlGaAs active waveguides (Jarrahi M, Pease R. F. W, Miller D. A. B, and Lee T. H, "Optical switching based on high-speed phased array optical beam steering," Applied Physics Letters. Vol. 92, 014106, 2008), but only about six degree steering angle is achieved. However, for waveguide based systems, it is also a very difficult task to arrange a two-dimensional OPA, as achieving high stacking efficiency of multiple layers is extremely challenging.

Designs are needed in the art to implement two-dimensional optical phased arrays with high speed and large angle tunability of beams with substantial relaxation in the fabrication difficulties associated with such structures.

SUMMARY OF THE INVENTION

The above problems and disadvantages of the above approaches to provide high speed, large angle scanning of optical beams in a two dimensional system are overcome by the present invention which consists of a slow-light photonic crystal waveguide array on a substrate.

One embodiment of the invention provides a two dimensional optical phased array comprising an air core photonic crystal waveguide formed in a semiconductor material which has a high thermo-optic coefficient. The semiconducting material made up of the first dielectric constant consists of a top and a bottom flat surface and is optically transparent beyond 1100 nm wavelength. A triangular lattice of air holes is etched into the semiconducting material from the top surface to the bottom surface of the semiconducting material, forming a hexagonal close pack photonic crystal structure. A surface-normal photonic crystal waveguide is defined by forming a larger air hole at the center of the photonic crystal lattice from the top surface of the semiconducting material to the bottom surface of the semiconducting material. The air hole diameters, including the large central air hole and the periodicity of the air holes are controlled in order to generate a photonic bandgap in the wavelength range of interest. The high dielectric constant contrast between the semiconducting material and air facilitates the formation of a slow-light mode within the photonic bandgap which is characterized by a very large group index.

An optical phased array has radiating elements separated by standard distances in order for the radiated beams to constructively interfere in certain directions compared to other directions. Multiple photonic crystal waveguides are patterned and arranged in an N×N array with center to center distance between the waveguides arranged appropriately in order to satisfy beam forming criteria. Light is coupled into the photonic crystal waveguide array from a substrate guided wave holographic array which has an N×N fanout. When light with wavelength within the slow-light regime is input to the photonic crystal waveguide, significant slow down of light occurs due to high group index. By changing the temperature of the semiconducting material, the first dielectric constant is changed due to the thermo optic effect, leading to a significant change in the group index. As a result, light within the photonic crystal waveguide undergoes a large change in phase due to a large change in group index. Electronic control of temperatures of the individual photonic crystal waveguides provides the required phase relationship among the radiating elements for continuous beam steering. The sub-wavelength lattice of air holes in the semiconducting material can be engineered to cover the wavelength range of interest. Due to the large change in group index, the length of the surface normal photonic crystal waveguide, measured as the distance between the top and the bottom surfaces of the semiconducting material can be as small as twenty microns to provide the required phase shift. The semiconductor material can be Silicon due to its large thermo optic coefficient. Multiple beam steering is enabled by time division control of each wavelength. Within a given time slot, only one wavelength is steered. By arraying the time slots, different wavelengths are steered. Due to the high thermo-optic coefficient of Silicon and the presence of engineered surface normal slow-light photonic crystal waveguide, steering angle in excess of 45°× 45° is achieved. Due to the fast conduction of heat through Silicon, sweep speeds in excess of $25 \times 10^6$ degrees/second are achievable. Such large angles and speeds are unachievable by any of the current methods.

To summarize:

The primary objective of the invention is to simplify the process of optical beam steering by providing a compact two dimensional integrated surface normal slow-light photonic crystal waveguide array that can be integrated with heating electrodes and a holographic light coupler array to implement fast, large angle dynamic steering of multiple optical beams.

The second objective of the invention is to eliminate the need for precise layer by layer arrangement required in the conventional waveguide systems in order to generate the two dimensional array and to provide a one step manufacturing process for the device, thereby greatly simplifying its fabrication.

The third objective of the invention is to simplify light injection into the device by using a holographic fanout array. Controlled diffraction efficiencies of the holograms can provide uniform light intensities to each photonic crystal waveguide in the array.

The fourth objective of the invention is to implement a novel surface normal slow-light photonic crystal waveguide using high thermo-optic coefficient material in order to achieve very large phase shifts within very short lengths of waveguide.

Other objectives and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments of the present invention, which may be embodied in various forms. It is to be understood that in some instances various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein:

FIG. 1 is a schematic drawing showing the design of a two dimensional optical phased array device based on an array of N×N surface normal slow-light photonic crystal waveguides. In FIG. 1, N is chosen arbitrarily as fourteen for space constraints.

FIG. 4a is a schematic drawing showing the substrate guided wave (SGW) holographic fanout array to couple light into the slow-light surface-normal photonic crystal waveguide array. In FIG. 4a, a 4×4 fanout structure is chosen due to space constraints.

FIG. 7 shows the voltage scheme in order to achieve multibeam steering. In FIG. 7, only four wavelengths are shown to represent four beam steering. In principle, any number of beams can be steered.

DETAILED DESCRIPTIONS OF THE PREFERRED EMBODIMENTS

Detailed Description of the Invention

In accordance with a preferred embodiment of the present invention, a device for optical beam steering comprises: a two-dimensional array of surface normal photonic crystal waveguides, an input light coupler comprising a substrate wave guided (SWG) holographic fanout array, a photonic crystal waveguide taper, and heating metal electrodes. Light from a tunable laser source is coupled into the SWG. The SWG creates a two dimensional fanout array with uniform intensities at the outputs, which are coupled into the two dimensional photonic crystal waveguide array. Metal heating electrodes in each pixel change the refractive index of the material, thereby changing the group index, due to the dependence of group index (which is also a function of wavelength) on temperature. Thus, a group index contrast is achieved via temperature tuning, which thereby produces a large phase shift in the optical beam. The temperature change of each pixel is controlled in order to generate a constant phase shift between adjacent pixels for beam steering.

In another embodiment of the present invention, a pixel in the optical beam steering device comprises: a surface normal photonic crystal waveguide with a central large air core with a periodic array of sub-micron holes around that form the cladding, a pair of heating electrodes on the pixel, and an air trench surrounding the pixel. The high index contrast between the substrate material and air in the photonic crystal matrix leads to the opening of a large photonic band gap. The defect mode, due to the central core within the bandgap, exhibits a dispersion relation with slope approaching zero close to the band edge. Due to the lowering of the slope of the defect mode, very high group index can be achieved, which slow the photons considerably within the device. Heating the substrate material via metal heating electrodes positioned around the pixel changes the refractive index of the substrate material via the thermo-optic effect, which alters the band structure and modifies the group index. Therefore, depending on the temperature change induced, a very large change in group index is achieved, which alters the phase of light accordingly. The air trench surrounding each pixel provides isolation from the adjacent pixels, thus, eliminating crosstalk.

Methods for fabricating slab photonic crystal structures are widely described in the literature. However, none describe methods for fabricating surface normal photonic crystal waveguides. Unlike conventional thinking where the waveguides in a photonic integrated circuit (PIC) are always built parallel to the substrate, which will require N lithographically defined waveguide layers to provide a N×N phased array, a surface-normal two-dimensional slow-light photonic crystal waveguide array can be vertically built in one lithography layer. Due to the slow-light effect, it provides the required phase shift larger than liquid crystal with 20 μm interaction length while maintaining the pixel (emitter) to pixel separation small enough to cover the total field of view (FOV), greater than 45°×45°, and the instantaneous field of view of less than 0.5°. This will significantly increase the yield rate to greater than 98% without sacrificing the performance metrics since only one primarily defined lithography layer, rather than an N-layer approach is used.

Detailed descriptions of the preferred embodiments are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure, or manner. This section will provide detailed description of the preferred embodiments in the aspect of device architecture, as well as the design concept and working principle.

Figure 1:
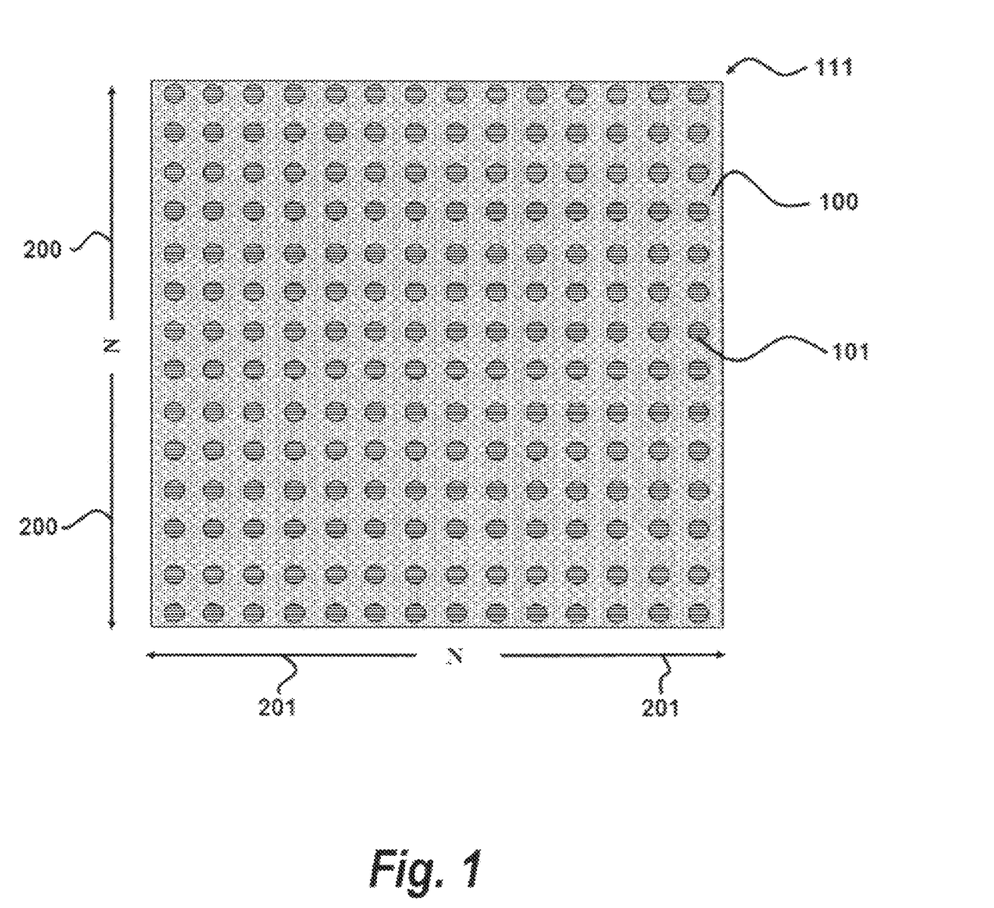
Figure 2:
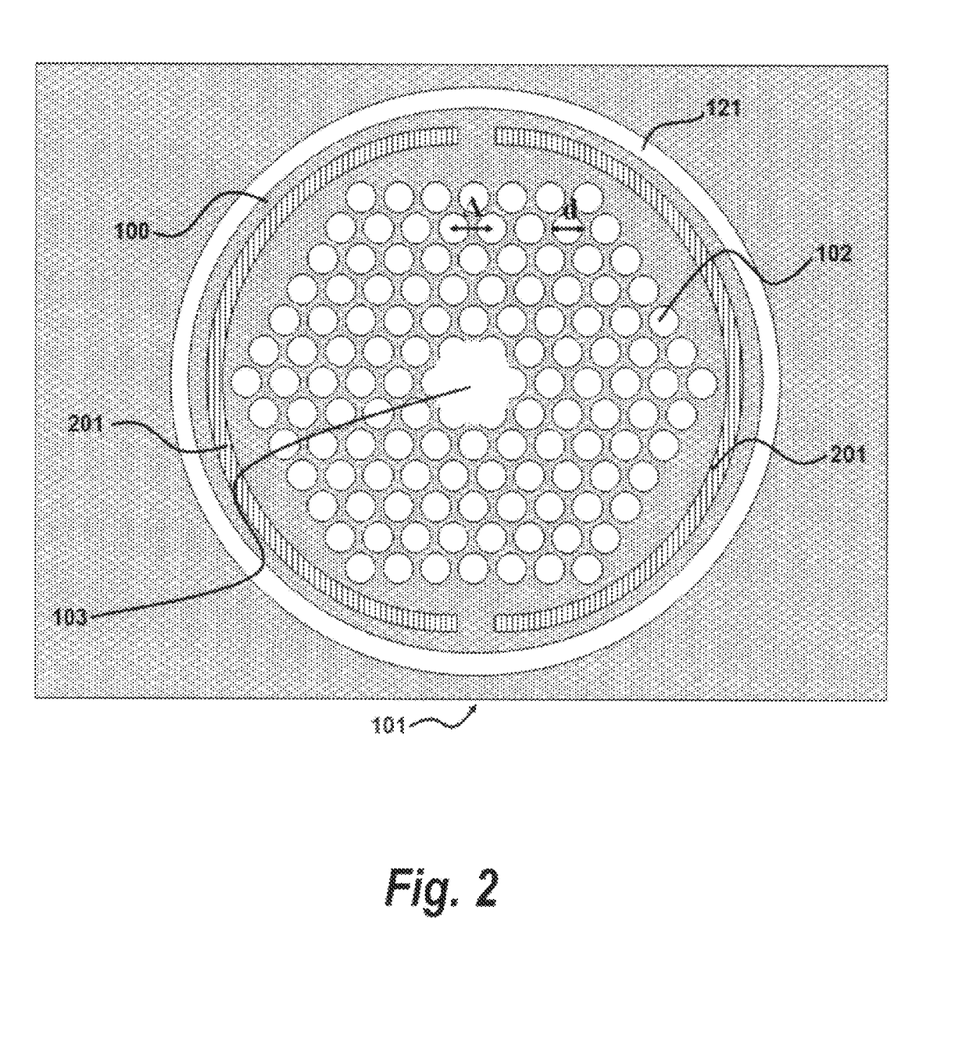
FIG. 2 is a top view of one embodiment of a surface normal slow-light photonic crystal waveguide. The optical waveguide at the center is formed by omitting seven circular air holes with diameter d and period Λ. A circular air trench isolates the pixel from the rest of the structure for independent phase control.
Figure 3:
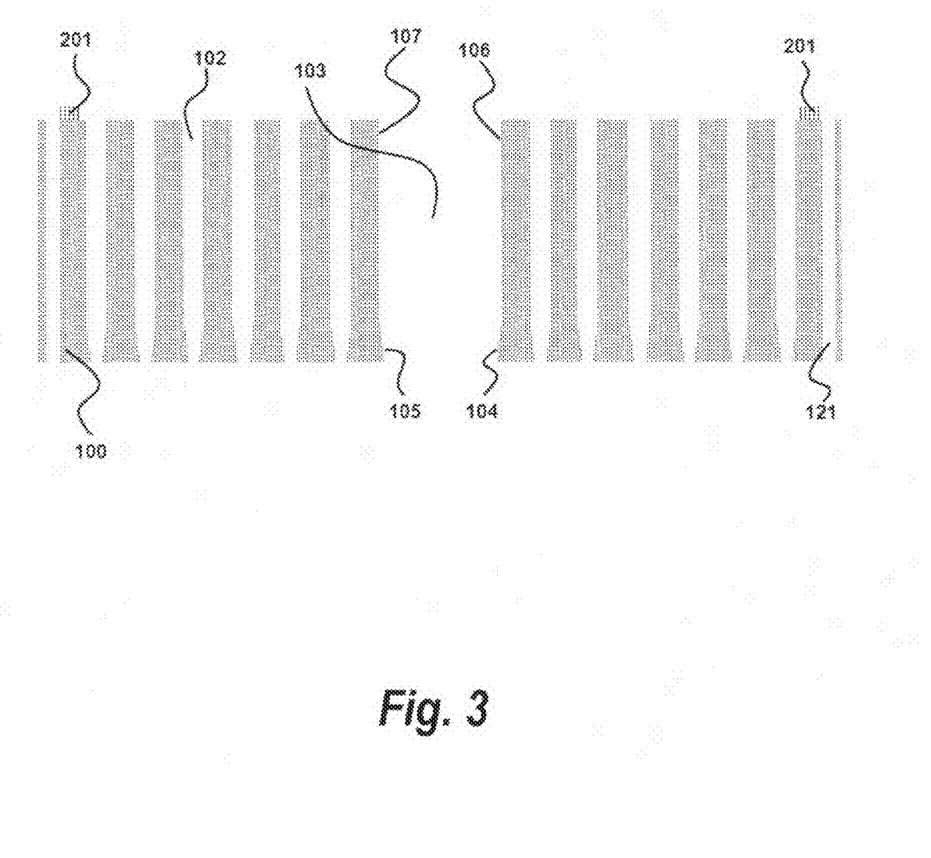
FIG. 3 is a cross-sectional view of the surface normal photonic crystal waveguide depicted in FIG. 2.

FIG. 1 presents a schematic drawing of a two-dimensional slow-light surface normal photonic crystal waveguide array 111. It consists of a semiconductor material 100 with a high refractive index. The semiconductor material 100 is optically transparent beyond 1100 nm. The lengths of all the waveguides in the N×N array are equal. FIG. 2 is an enlarged view of pixel 101 of FIG. 1, showing the top view of the photonic crystal waveguide and the heating electrodes. The photonic crystal pattern consists of a hexagonal close pack array of air holes 102 of diameter d with a periodicity of air hole pattern given by $\Lambda$. The core 103 is formed by removing seven air holes to form a larger air hole at the center. Metal heating electrodes 201 surround the air hole array. By passing current through the electrodes, the temperature of the semiconducting material 100 is altered. An air trench 121 around the photonic crystal structure isolates the pixel from the rest of the semiconducting material 100, thereby providing independent phase shift in any pixel. The photonic crystal waveguide of each pixel supports guided modes within a wavelength range of 1433 nm to 1674 nm at 300K. With reference to FIG. 3, which is a cross-sectional view of the surface-normal photonic crystal waveguide 101 in FIG. 2, taken along a diametric line passing through the center, the column members 102 and 103 extend from the top to the bottom of the semiconductor material 100. In the preferred embodiment, the top surface forms the input, whereas the bottom surface forms the output. Although the structure within the slab 100 is substantially uniform in the vertical direction in this embodiment in the top part with vertical sidewalls 106 and 107, vertically non-uniform structure, such as the columnar members at the bottom whose radii are varying along the vertical direction, creating tapered sidewalls 104 and 105 is used to provide group index matching and reduce reflections due to large group index contrast. The metal electrodes 201 are present at the periphery of the photonic crystal structure on the top surface. The refractive index of the semiconducting material 100 is changed by passing current through the metal electrodes. The pixel is isolated from the bulk semiconducting material 100 via trench 121 that extends from the top to the bottom surface.

Figure 4A:
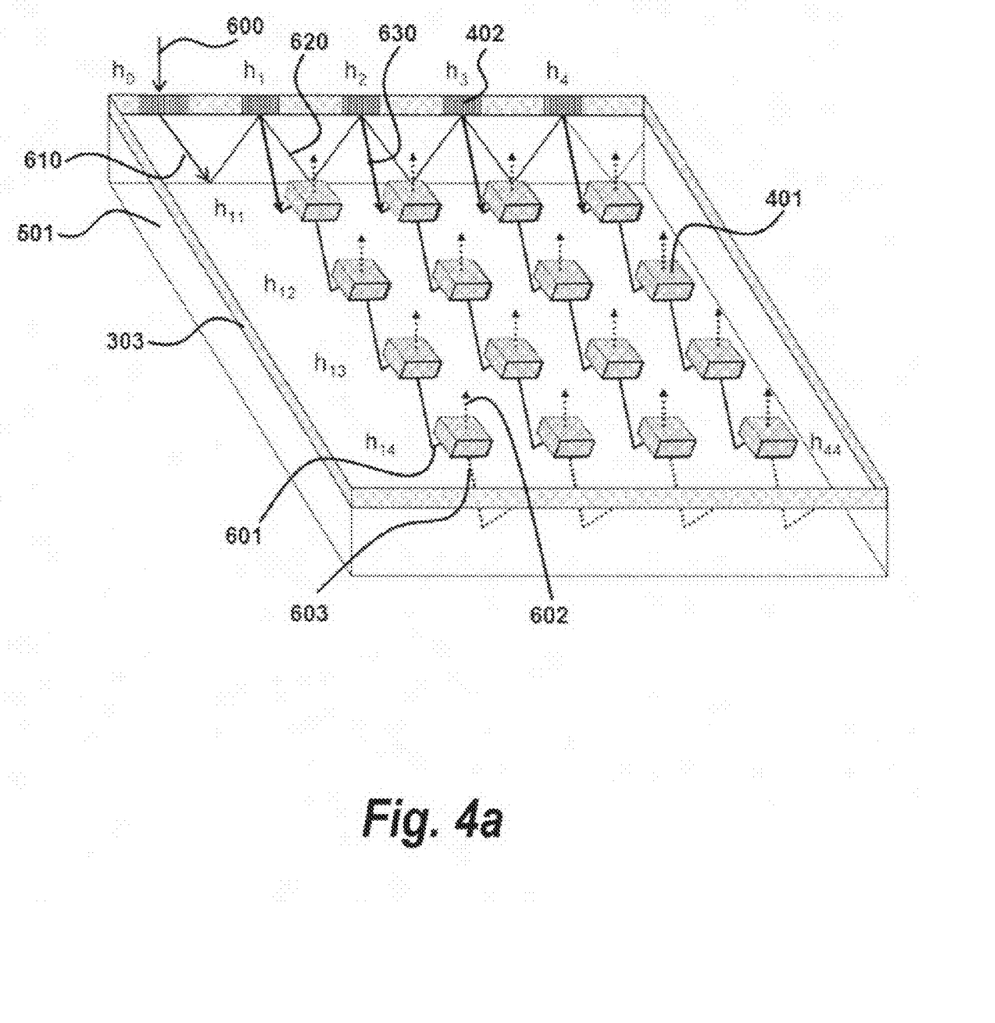

An important part of the design of the optical phased array is the input light coupler. In the preferred embodiment, a substrate guided wave (SGW) holographic fanout array is utilized. This optical component takes input laser light injected into the substrate from the laser source and out-couples the light efficiently into an array of collimated beams corresponding to the array of slow-light photonic crystal waveguides and, consequently, the array of output facets. FIG. 4a shows the structure for a 1 to 16 SWG holographic fanout structure. The SWG consists of a transparent glass substrate 501 on which a photopolymer material film 303 is coated. The glass substrate 501 is optically transparent beyond 1100 nm. Input light 600 is coupled into the glass substrate via hologram $h_0$ written in the photopolymer film 303. The coupled light 610 is distributed throughout the glass substrate along specified directions 620 and 630 via holograms $h_1$ through $h_4$. Holographic elements 401 are formed at positions corresponding to the surface-normal photonic crystal waveguide pixel elements on the OPA structure. The holographic elements 401 operate over a wavelength range between 1100 nm to 2000 nm. The figure shows a 4×4 fanout array consisting of holographic elements $h_{11}$ through $h_{44}$. Incoming light 601 is guided via total internal reflection within the glass substrate 501. At the fanout hologram element 401, a portion of light 601 is diffracted out into light 602 and the remaining light 603 is guided within the glass substrate 501 towards the next fanout hologram element. The efficiency of each fanout hologram element is controlled in order to produce a uniform fanout light 602 intensity across the entire array.

Figure 4B:
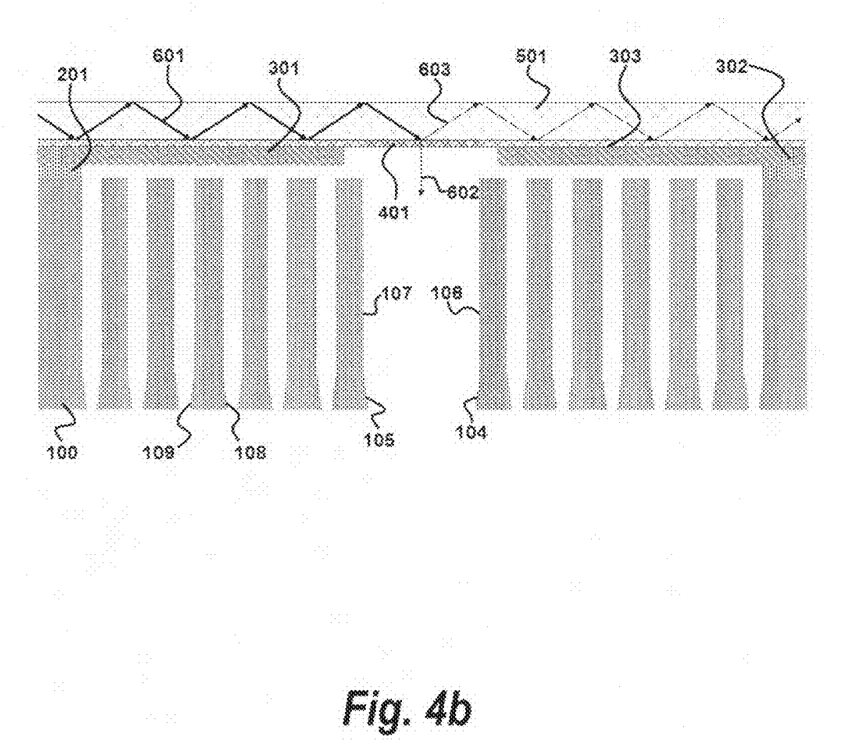
FIG. 4b is a cross-sectional view of the surface normal photonic crystal waveguide depicted in FIG. 2 along a power distribution layout and a substrate guided holographic fanout structure to couple light into the photonic crystal waveguide structure.

FIG. 4b shows the cross section of the pixel along with the SWG holographic element to couple light into the surface-normal photonic crystal waveguide structure. In the preferred embodiment, a transparent substrate 301 is bonded on top of the pixel and metal interconnections are run in to control the pixel through vias 302. At the location above the input of the surface-normal photonic crystal waveguide, the hologram element 401 is written in the photopolymer material. As a result, a portion of the incoming light 601 is diffracted out into light 602 into the photonic crystal waveguide and the remaining light 603 is guided within the glass substrate 501.

Figure 5A:
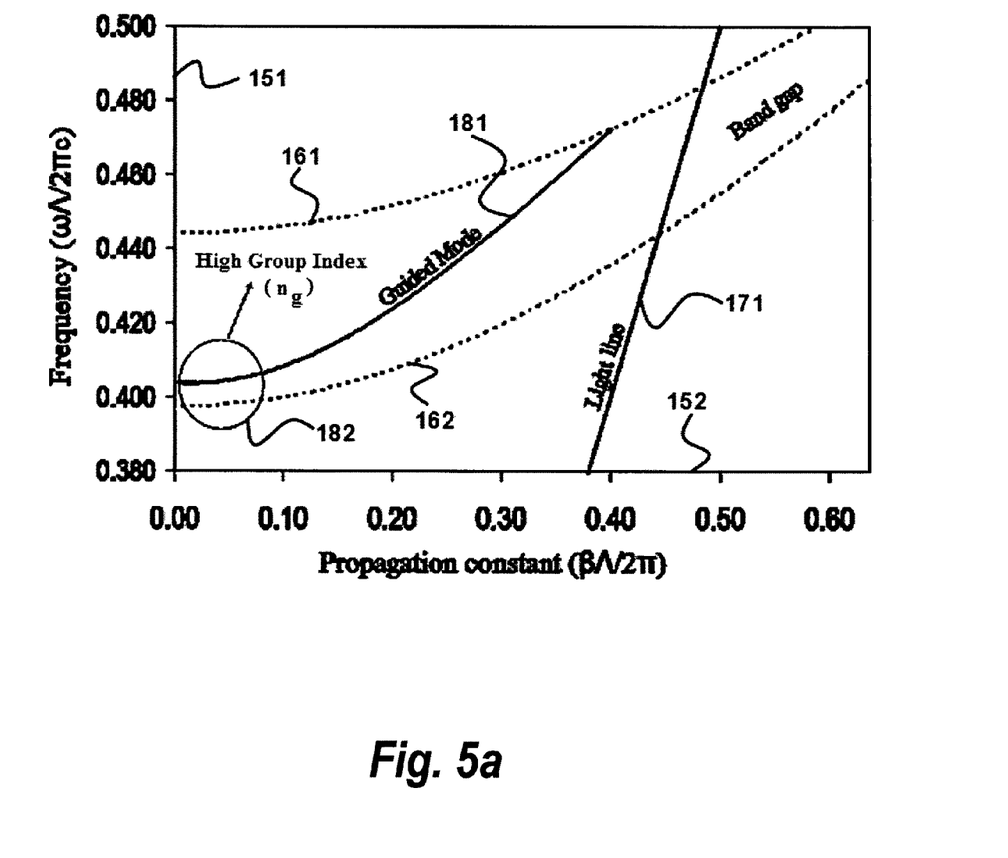
FIG. 5a is a calculated band diagram of the device shown in FIG. 2.

In FIG. 5a, the calculated frequency 151 versus propagation constant 152 relation for the surface-normal photonic crystal structure is presented. The region between the dashed curves 161 and 162 represents the photonic band gap for the structure with design parameters chosen as $\Lambda=0.678$ μm and $d=0.89\Lambda$. The waveguide 103 (central defect) of FIG. 2 breaks the periodicity and creates a defect mode (guided mode) 181 within the bandgap. Since the mode 181 lies above the light line 171 and within the bandgap, it will be guided through the central core 103 from the input to the output. Close to where the propagation constant approaches a value of zero, highlighted by a circle 182, the slope becomes extremely small, indicating that the group velocity also becomes extremely small. Since the group index is inversely proportional to the group velocity, its value close to $\beta=0$ becomes very large.

Figure 5B:
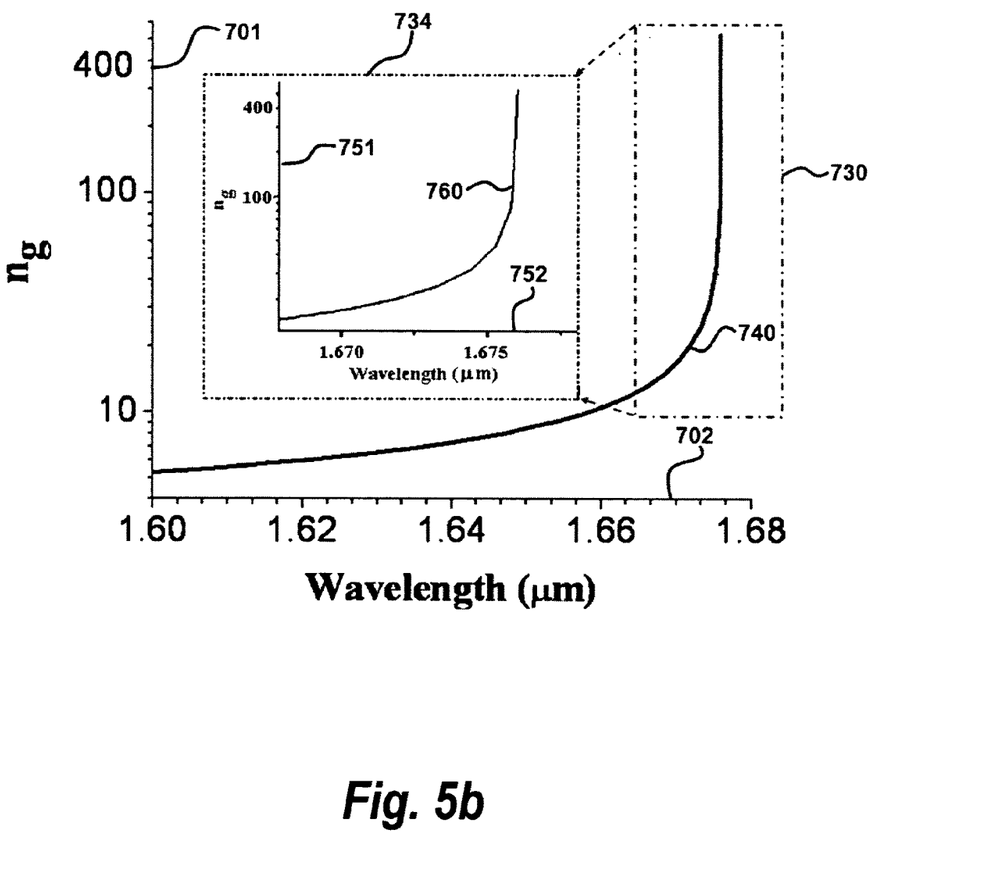
FIG. 5b illustrates the dispersion relation of the surface normal photonic crystal waveguide device depicted in FIG. 2 with the slow-light mode shown to exhibit very high group index. An enlarged view of the dispersion relation in the slow-light region is also shown in the inset.
Figure 6:
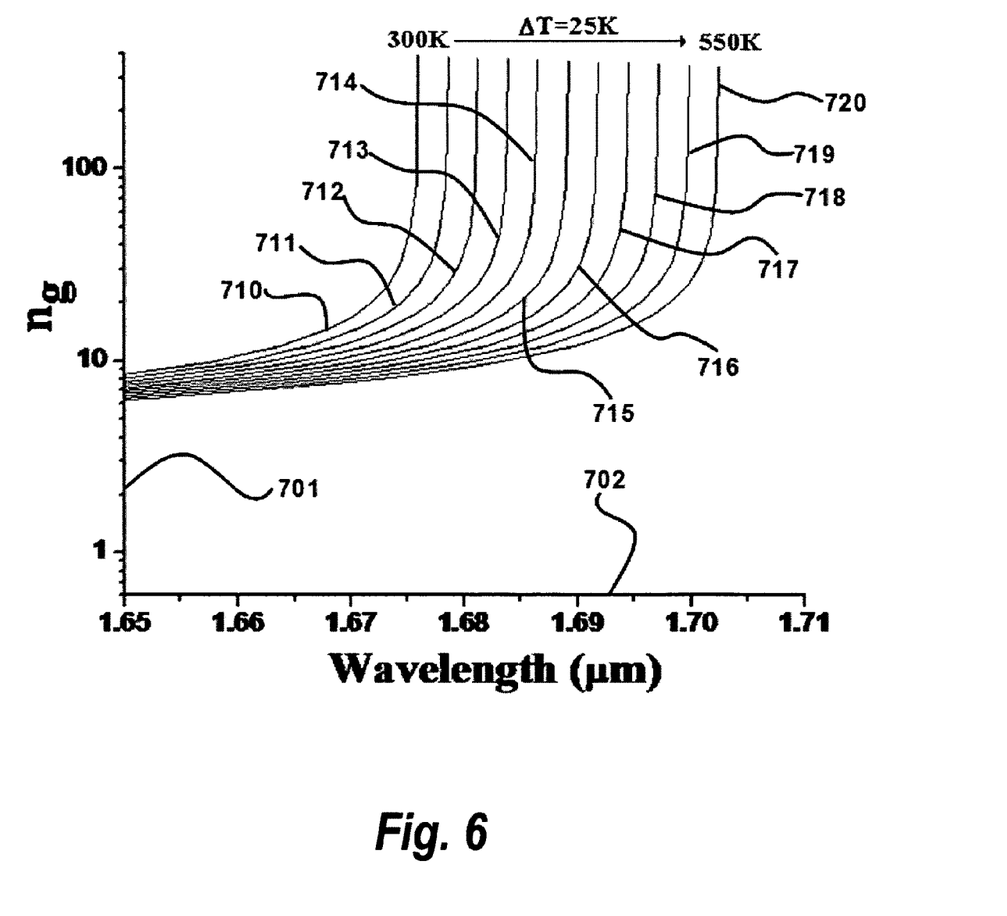
FIG. 6 illustrates the dispersion relation of the surface normal photonic crystal waveguide depicted in FIG. 2 plotted for different temperatures of the device substrate.

FIG. 5b shows the calculated group index ($n_g$) 701 of the guided mode as a function of the wavelength 702. As evidenced in FIG. 5b, there is a strong dependence of group index on wavelength. An enlarged view of the section highlighted by the rectangular box 730 is shown as an inset in FIG. 5b inside rectangular box 734. The calculated curve 760 shows a large change in group index from 13 to 500 for a change in wavelength from 1.665 μm to 1.676 μm. By altering the refractive index of the semiconducting material, the guided mode 181 and band edges 161 and 162 in FIG. 5a can be shifted up or down, thereby, causing the group index curve 740 in FIG. 5b to move to the left or to the right. Therefore, a large change in group index at a given wavelength can be achieved via changing the refractive index of the semiconducting material. In one embodiment, the thermo-optic effect is utilized, whereby the refractive index of the material is changed by locally heating or cooling the structure. The dependence of group index-wavelength relation on temperature is presented in FIG. 6. The group index curves 710-720 are obtained by changing the temperature of the semiconducting material from 300K to 550K in steps of 25K. As the temperature is raised, the group index curve shifts towards longer wavelengths. Due to large group index change achievable within a small wavelength shift, the temperature change required to obtain large phase shift is small. The control signal applied to each pixel $C_{n,m,\lambda}(t)$, is given by:

$$C_{n,m,\lambda}(t)=A_{n,m,\lambda}+B_{n,m,\lambda}(t) n,m=1,2,3,4,\ldots,N \qquad (1)$$

where N is the dimension of the array, $A_{n,m,\lambda}$ is the DC component, and $B_{n,m,\lambda}(t)$ is the time dependent component of the voltage applied to the (n, m) element of the (N, N) 2D array. It should be noted that both A and B are a function of wavelength due to the dependence of group index on wavelength. For each wavelength, $A_{n,m,\lambda}$ is chosen to provide a zero degree beam steering of the array in the absence of $B_{n,m,\lambda}(t)$. Computer software controls the waveform applied to each pixel based on the matrix C in order to sweep the beam. By individually controlling the temperature of each of the pixels in the N×N array, the required phase relationship among all pixels for optical beam steering can be achieved.

Figure 7:
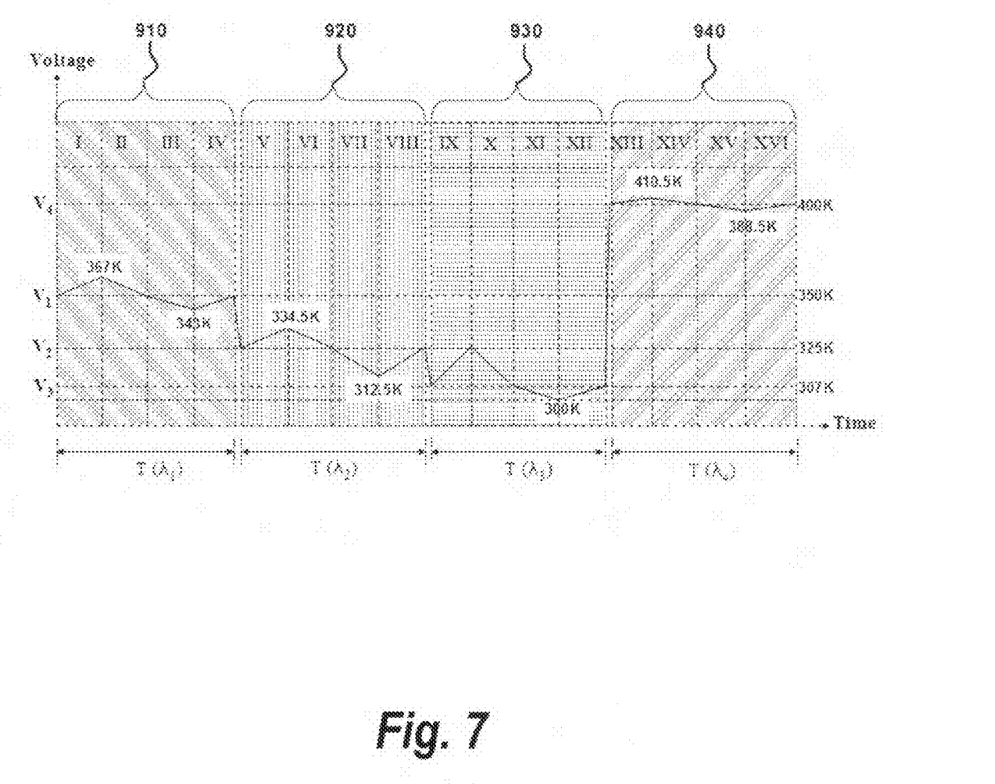
Figure 8:
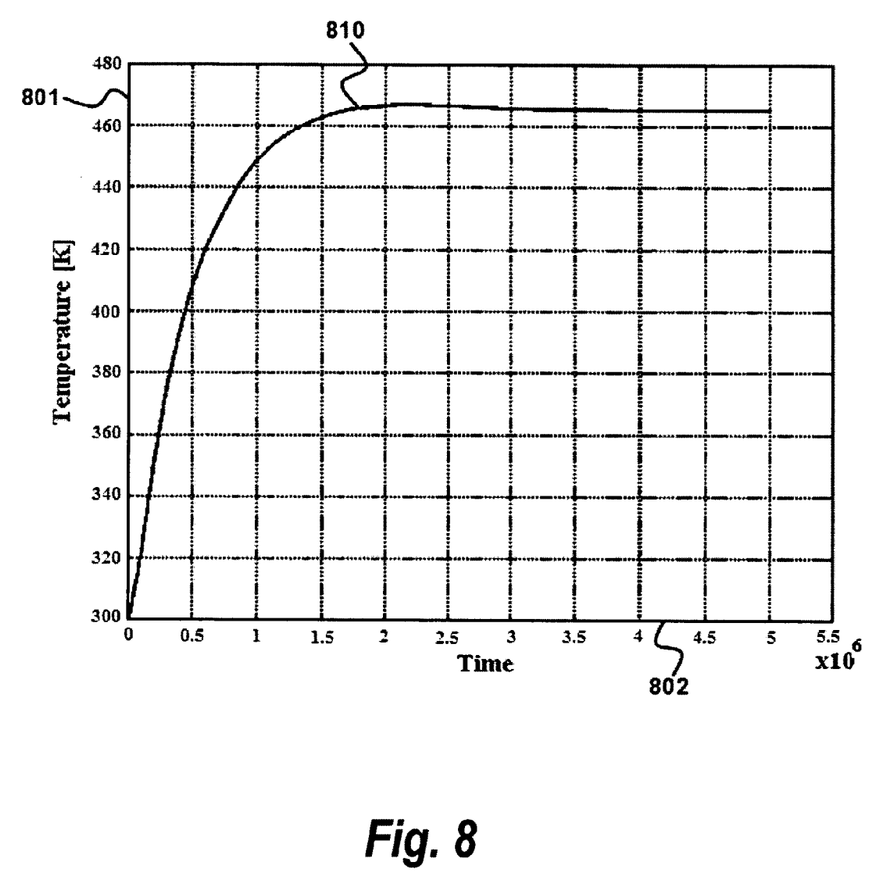
FIG. 8 shows the transient response of the surface normal slow-light photonic crystal waveguide device due to a 20V pulse applied across the two semicircular metal electrodes depicted in FIG. 2. The rise time gives an indication of the speed of the device

Optical beam steering is obtained via temperature control of the pixels. In one embodiment, sweeping of a single optical beam can be achieved by modulating the temperature of each pixel about a central temperature using a computer controller. In another embodiment, multiple optical beams can be steered by utilizing a time division multiplexing scheme. A scheme of electrical control for steering four independent beams for the pixel requiring maximum phase shift in a 64×64 array consisting of 8×8 subgroups, each with 8 elements with spacings of $5\lambda_0$, $5.5\lambda_0$, $6.5\lambda_0$, $8.5\lambda_0$, $9.5\lambda_0$, $10.5\lambda_0$, $11.5\lambda_0$, and $14.5\lambda_0$ is shown in FIG. 7. For example, in order to steer four wavelengths at 1.680 μm, 1.678 μm, 1.676 μm, and 1.685 μm independently, a maximum $\Delta n_g$ of ±34 for greater than 45°×45° beam steering is required. From preliminary calculations, steering of 1.680 μm wavelength in section 910 is achieved by choosing a base temperature of 350K. By heating and cooling the pixel to 343K and 367K, the required $\Delta n_g$ of ±34 is obtained. For 1.678 μm in section 920, a base of 325K is chosen and heating and cooling the pixel to 312.5K and 334.5K respectively provides $\Delta n_g$ of ±34. For 1.676 μm in section 930, heating and cooling to 300K and 325K, respectively centered at 307K and for 1.685 μm in section 940, heating and cooling to 388.5K and 410.5K, respectively centered at 400K provides $\Delta n_g$ of ±34. These temperatures are chosen such that the device operates at a center group index of 50. The taper design will adiabatically reduce group index to the output and achieve very good output coupling for all wavelengths. The voltage is applied in four phases for each signal to enable sweeping of individual beams. The time interval for each of the sections 910, 920, 930 and 940 depends on the temperature response of the pixel. FIG. 8 shows the simulation of temperature response 810 within a 20 μm long photonic crystal waveguide due to the application of a 20V signal across the metal heating electrodes. The transient characteristics reveal a slope of temperature rise of $15\times10^6$ K/s. Therefore, extremely high slew rates for 45°×45° steering of $25\times10^6$ degrees/second can be obtained. Such wide angle, agile, and ultra-fast beam steering is unachievable by other methods proposed so far.

Figure 9:
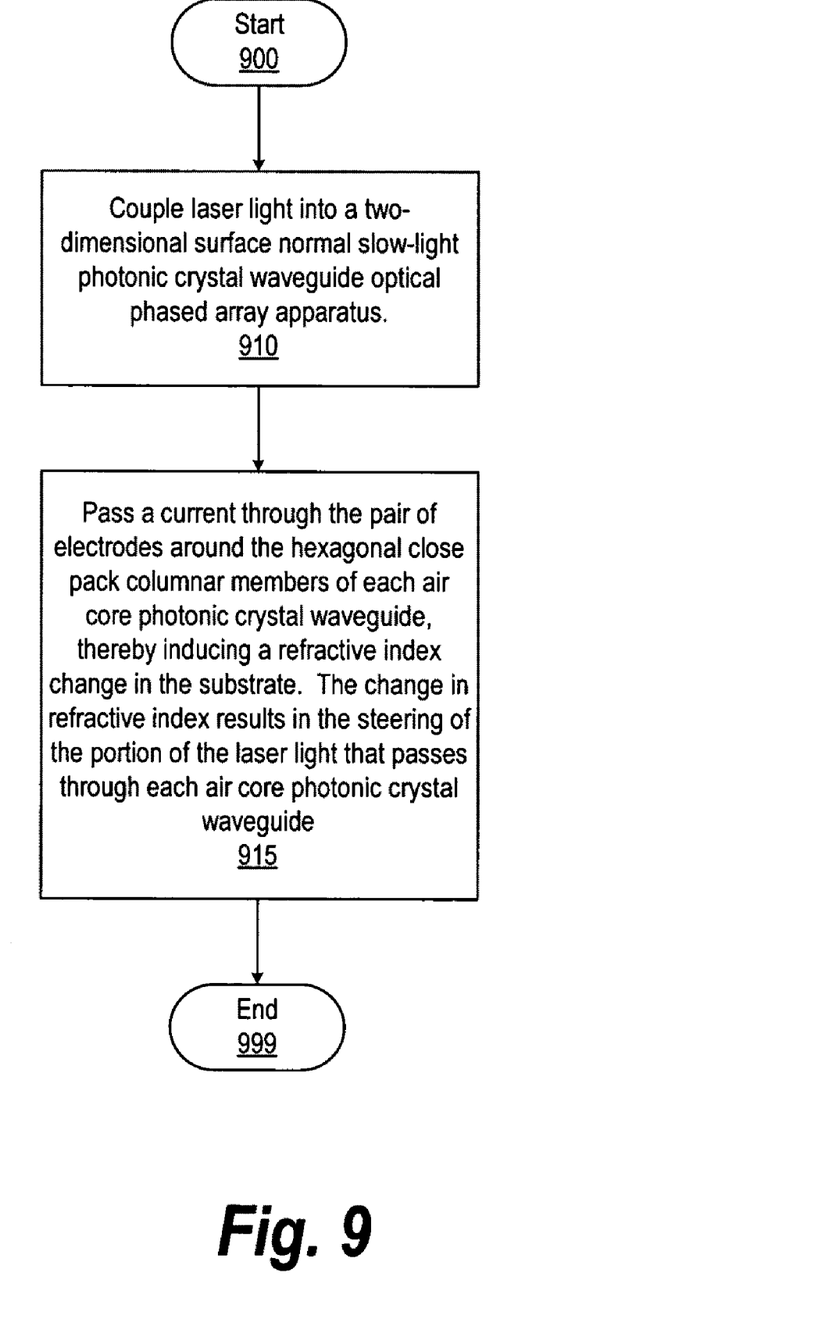
FIG. 9 is a flow diagram illustrating a method for optical beam steering, in accordance with some embodiments.

FIG. 9 is a flow diagram illustrating a method for optical beam steering, in accordance with some embodiments. In some embodiments, the method illustrated in FIG. 9 may be performed by one or more of the devices illustrated in FIG. 1, FIG. 2, FIG. 3, FIG. 4a, and FIG. 4b. Processing begins at 900 whereupon, at block 910, laser light is coupled into a two-dimensional surface normal slow-light photonic crystal waveguide optical phased array apparatus. At block 915, a current is passed through the pair of electrodes around the hexagonal close pack columnar members of each air core photonic crystal waveguide, thereby inducing a refractive index change in the substrate. The change in refractive index results in the change of phase of the laser light that passes through each air core photonic crystal waveguide, which leads to beam steering. Processing subsequently end at 999.

Although the word "light" or "beam" is used to denote signals in the preceding discussions, one skilled in the art will understand that it refers to a general form of electromagnetic radiation that includes, and is not limited to, visible light, infrared light, ultra-violet light, radios waves, and microwaves.

Although the device described herein is for an optical beam steering device, one skilled in the art will understand that the structure in its general form of applications include but are not limited to sensors, wide angle imaging systems, intra-chip communication systems with a communication mainframe, etc.

In summary, the present invention provides an ultra compact optical phased array device architecture using two-dimensional surface-normal low-light photonic crystal waveguides, together with a light input technique involving substrate guided wave holographic fanout array that provides uniform intensity to each pixel via the adjustment of hologram efficiencies. The invention enables the realization of an ultra-fast, large angle optical beam steering device, with a great relief in fabrication efforts due to its realization in a single lithography step, thereby maximizing the OPA yield. Owing to the small dimensions of the pixels presented herein, one can monolithically integrate the photonic crystal waveguide array on silicon VLSI chips. The CMOS compatible photonic crystal waveguide OPA devices have simpler design requirements than the microelectronics industry. The device is of extreme significance in sensing, imaging, communication, search and rescue, and warfare defense.

While the invention has been described in connection with a number of preferred embodiments, it is not intended to limit the scope of the invention to the particular form set forth, but on the contrary, it is intended to cover such alternatives, modifications, and equivalents as may be included within the design concept of the invention as defined by the appended claims.

What is claimed is:

1. An ultra-fast, compact optical phased array apparatus for optical beam steering, comprising:
   a first substrate comprising a top surface and a bottom surface;
   an array of air core photonic crystal waveguides in the first substrate comprising an input on the top surface of the first substrate and an output on the bottom surface of the first substrate;
   columnar members etched in a hexagonal close pack around each air core photonic crystal waveguide;
   a pair of metal electrodes around the hexagonal close pack columnar members of each air core photonic crystal waveguide;
   a trench around the pair of metal electrodes of each air core photonic crystal waveguide;
   a second substrate coupled to the top surface of the first substrate comprising electrical interconnection lines and vias coupled to each pair of metal electrodes; and
   a substrate guided wave holographic fanout array comprising:
      a third substrate comprising a top surface and a bottom surface;
      a photopolymer film coated on the bottom surface of the second substrate;
      a hologram written in the photopolymer film configured to couple a laser light into the third substrate; and
      an array of holograms recorded in the photopolymer film wherein the array of holograms are configured to couple a portion of the laser light into the array of air core photonic crystal waveguides.

2. The apparatus of claim 1, wherein the array of air core photonic crystal waveguide support guided modes within a wavelength range of 1433 nm to 1674 nm at 300K.

3. The apparatus of claim 2, wherein the wavelength range extends to 1705 nm at 550K.

4. The apparatus of claim 1, wherein the input of the air core photonic crystal waveguide has a vertical sidewall and the output of the air core photonic crystal waveguide has a tapered sidewall.

5. The apparatus of claim 1, wherein the bottom surface of the third substrate with the photopolymer film coated on the bottom surface of the third substrate is coupled to the second substrate.

6. The apparatus of claim 1, wherein the pair of metal electrodes comprises at least one of: gold, silver, copper, aluminum, tungsten, titanium, tantalum, cobalt, nickel, palladium, zirconium, hafnium, vanadium, chromium, and alloys thereof.

7. The apparatus of claim 1, wherein the first, second, and third substrates are optically transparent beyond 1100 nm.

8. The apparatus of claim 1, wherein the first substrate comprises at least one of: silicon, germanium, carbon, gallium nitride, gallium arsenide, gallium phosphide, indium nitride, indium phosphide, aluminum arsenide, zinc oxide, silicon oxide, silicon nitride, and alloys thereof.

9. The apparatus of claim 1, wherein the columnar members comprise a substantially columnar member formed from at least one of: air, silicon oxide, silicon nitride, and organic polymers.

10. The apparatus of claim 1, wherein the array of holograms operate over the wavelength range of 1100 nm to 2000 nm.

11. The apparatus of claim 1, wherein the diffraction efficiencies of each hologram of the array of holograms is configured to provide a uniform fanout beam.

12. The apparatus of claim 1, wherein each hologram of the array of holograms is recorded at the corresponding positions of the array of air core photonic crystal waveguides.

13. A method for optical beam steering, the method comprising:
   coupling a laser light into an optical phased array apparatus, the optical phased array apparatus comprising:
      a first substrate comprising a top surface and a bottom surface;
      an array of air core photonic crystal waveguides in the first substrate comprising an input on the top surface of the first substrate and an output on the bottom surface of the first substrate;
      columnar members etched in a hexagonal close pack around each air core photonic crystal waveguide;
      a pair of metal electrodes around the hexagonal close pack columnar members of each air core photonic crystal waveguide;
      a trench around the pair of metal electrodes of each air core photonic crystal waveguide;
      a second substrate coupled to the top surface of the first substrate comprising electrical interconnection lines and vias coupled to each pair of metal electrodes; and
      a substrate guided wave holographic fanout array comprising:
         a third substrate comprising a top surface and a bottom surface;
         a photopolymer film coated on the bottom surface of the second substrate;
         a hologram written in the photopolymer film configured to couple the laser light into the third substrate; and
         an array of holograms recorded in the photopolymer film wherein the array of holograms are configured to couple a portion of the laser light into the array of air core photonic crystal waveguides; and
   passing a current through the pair of metal electrodes around the hexagonal close pack columnar members of each air core photonic crystal waveguide to induce a refractive index change to change the phase of the portion of the laser light that passes through each air core photonic crystal waveguide.

14. The method of claim 13, wherein the array of air core photonic crystal waveguide support guided modes within a wavelength range of 1433 nm to 1674 nm at 300K.

15. The method of claim 14, wherein the wavelength range extends to 1705 nm at 550K.

16. The method of claim 13, wherein the input of the air core photonic crystal waveguide has a vertical sidewall and the output of the air core photonic crystal waveguide has a tapered sidewall.

17. The method of claim 13, wherein the bottom surface of the third substrate with the photopolymer film coated on the bottom surface of the third substrate is coupled to the second substrate.

18. The method of claim 13, wherein the pair of metal electrodes comprises at least one of: gold, silver, copper, aluminum, tungsten, titanium, tantalum, cobalt, nickel, palladium, zirconium, hafnium, vanadium, chromium, and alloys thereof.

19. The method of claim 13, wherein the first, second, and third substrates are optically transparent beyond 1100 nm.

20. The method of claim 13, wherein the first substrate comprises at least one of: silicon, germanium, carbon, gallium nitride, gallium arsenide, gallium phosphide, indium nitride, indium phosphide, aluminum arsenide, zinc oxide, silicon oxide, silicon nitride, and alloys thereof.

21. The method of claim 13, wherein the columnar members comprise a substantially columnar member formed from at least one of: air, silicon oxide, silicon nitride, and organic polymers.

22. The method of claim 13, wherein the array of holograms operate over the wavelength range of 1100 nm to 2000 nm.

23. The method of claim 13, wherein the diffraction efficiencies of each hologram of the array of holograms is configured to provide a uniform fanout beam.

24. The method of claim 13, wherein each hologram of the array of holograms is recorded at the corresponding positions of the array of air core photonic crystal waveguides.

25. The method of claim 13, where the method further comprises controlling the current applied to each pair of metal electrodes in order to induce a different constant phase between adjacent air core photonic crystal waveguides.

26. The method of claim 25, where the method further comprises steering the laser light by controlling the current applied to the pair of metal electrodes in each air core photonic crystal waveguide in the array in a time-division multiplexed format.

* * * * *